April 13, 1926.
A. G. A. SHAW
HEADLIGHT
Filed May 5, 1923
1,581,027
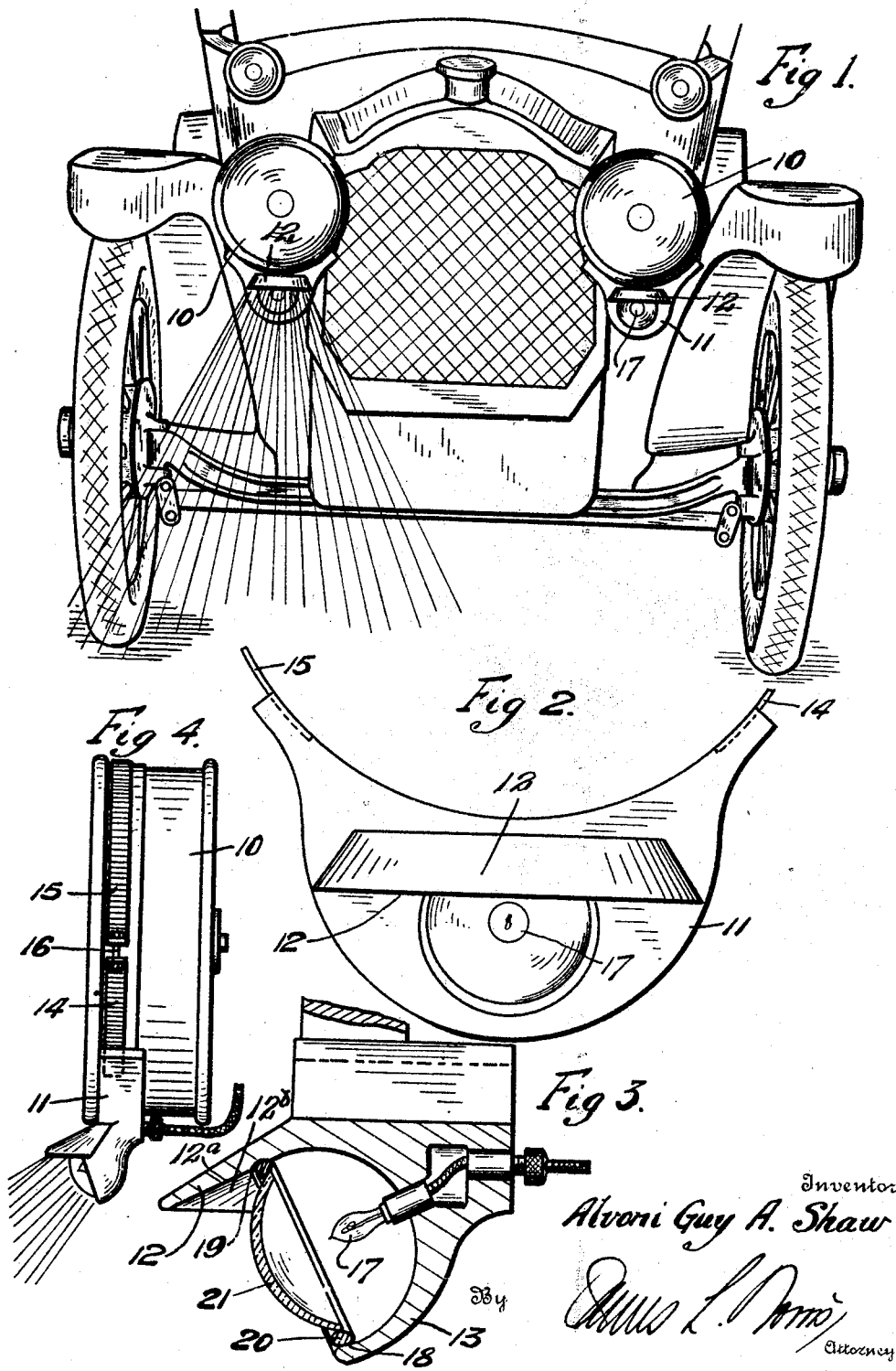
Inventor
Alvoni Guy A. Shaw
By
Attorney Patented Apr. 13, 1926.

1,581,027

UNITED STATES PATENT OFFICE.

ALVONI GUY ALEXANDER SHAW, OF BALTIMORE, MARYLAND.

HEADLIGHT.

Application filed May 5, 1923. Serial No. 636,952.

*To all whom it may concern:*

Be it known that I, ALVONI GUY A. SHAW, a citizen of the United States, residing at Baltimore, in the State of Maryland, have invented certain new and useful Improvements in Headlights, of which the following is a specification.

The present invention relates to headlights for vehicles adapted to be used in connection with the ordinary headlight now in use.

An object of the invention is to produce a headlight that may be used coincident with or alternately with the headlights in ordinary use.

In the use of ordinary headlights the glare in the eyes of an approaching pedestrian or driver is very strong and objectionable. For this reason, courtesy among automobilists requires that the lights be turned off in passing. This has its objectionable features, in that the driver is unable to see his course and is therefore likely to be ditched or otherwise misguided.

Another object of the invention is to so construct the supplemental light that it may be detachably mounted upon the main headlight.

Still another object is to construct said supplemental headlight so that the light therefrom may be thrown upon the road for a suitable distance in front of the vehicle to which it is attached and will be prevented from directly reaching the eyes of an approaching driver or pedestrian, while at the same time giving the driver of a vehicle to which it is attached a full view of the road in front of his own vehicle.

These lights may be used in pairs, one attached to each of the headlights and one of them may be red to show the danger side of the machine and the other white to disclose the side of the road.

An embodiment of my invention is illustrated in the accompanying drawings in which;

Figure 1 is the front of an automobile showing my invention attached to the headlights thereof.

Figure 2 shows on a scale enlarged as compared with Figure 1, in front elevation, my supplemental light detached from the main headlight.

Figure 3 shows in cross-section the arrangement of the light to the lens and to the visor or shield.

Figure 4 shows on a scale larger than that of Figure 1 but smaller than that of Figures 2 and 3, the attachment of my supplemental light to the headlight of an automobile the same being shown in side elevation.

Referring to the drawings in detail;

10 designates the headlights of an automobile; 11 designates the supporting member for the supplemental light, the upper side of which is formed with a seat preferably of concave contour to conform with the shape of the casing of a headlight and has projecting forwardly and downwardly from the upper portion a visor or shield 12. Formed within the member 11 is a chamber 11ª, the walls of which provide a casing 13 for the light. The chamber 11ª is preferably of a semicircular contour.

Attached to the supporting member 11 are straps 14 and 15 which have offset portions adapted to be connected by the bolts 16 by which the ends may be drawn together and clamped in place on the headlight 10. A lamp 17 is positioned within the cavity of the casing 13 and is connected with suitable means (not shown), for switching the light on and off independently of any conjunction of the switching on and off of the main lights. The cavity toward its outer edges is preferably formed on converging lines as at 18 on its lower edge and recessed on its upper edge at 19 to receive a ring 20, which in turn holds a lens 21 in place within the cavity, the ring being of soft metal such as copper, tin or the like adapted to be sprung into place.

It will be understood that the member 11 of my device may be made integral with the casing of the headlight 10, thus eliminating the straps, but I prefer the above construction.

What I claim as new is:

The combination with an automobile headlight of usual form, of a supplemental headlight attachment disposed in the center of the lower portion of the main headlight and comprising a casing having a semi-spherical cavity formed therein and disposed at a downward and forward angle of inclination, the forward extremities of the casing of the supplemental headlight being also disposed at a downward angle of inclination similar to the semispherical cavity, the upper wall of the supplemental headlight casing being projected beyond the front terminal of the lower wall and formed as a hood to prevent light rays from the supplemental headlight from flaring upwardly, the semispherical cavity having a convex lens serving as the front closure thereof, a downwardly inclined lighting means at the center of the rear wall thereof, the top portion of the casing of the supplemental headlight having a seat formed therein of the same contour as, and adapted to fit closely against, the lower portion of the casing of the main headlight, and fastening means attached to the upper portion of the casing of the supplemental headlight at opposite sides of the seat therein for embracing and removably securing the supplemental headlight to the main headlight.

In testimony whereof I have hereunto set my hand.

ALVONI GUY ALEXANDER SHAW.